United States Patent Office 2,789,655
Patented Apr. 23, 1957

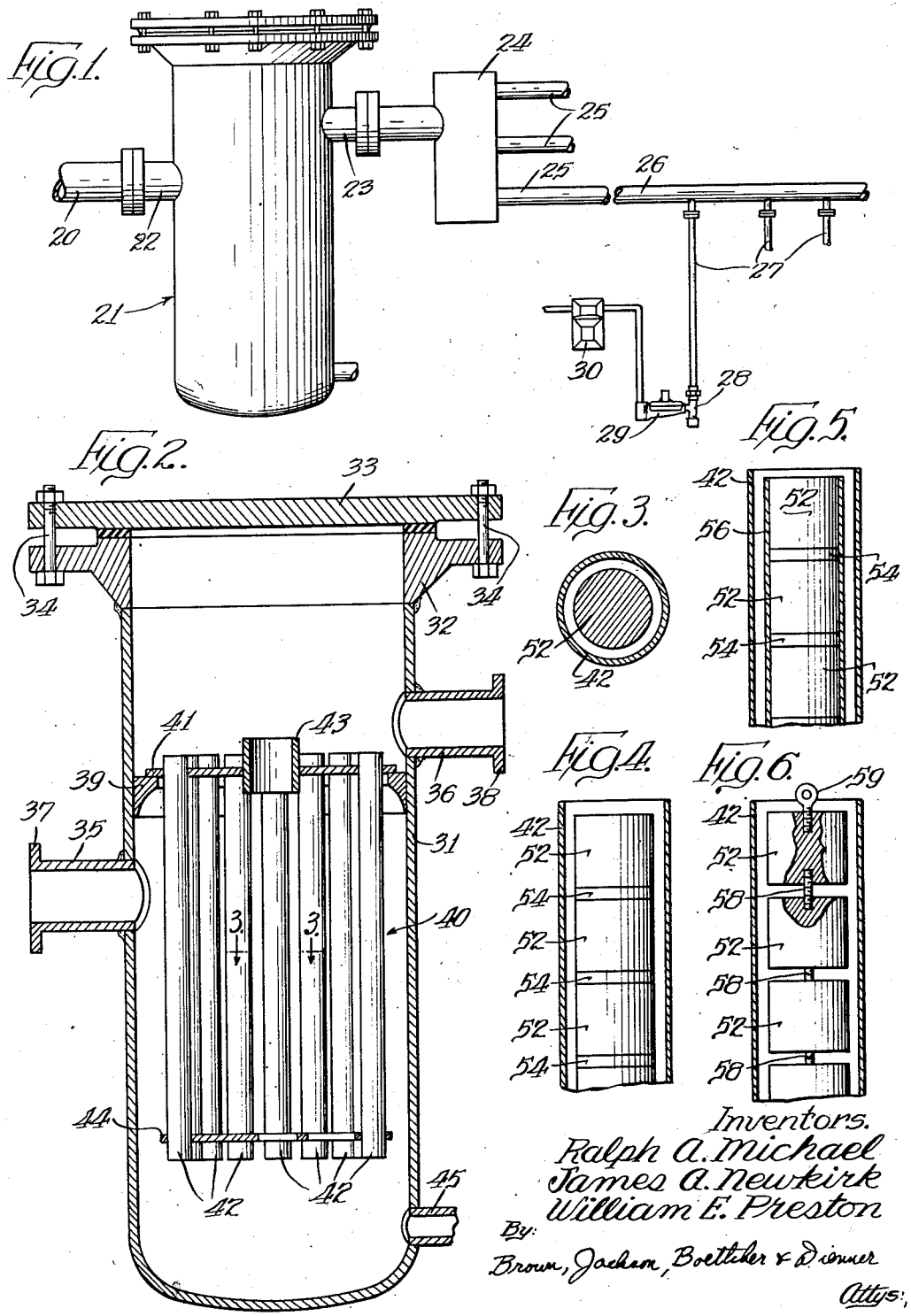

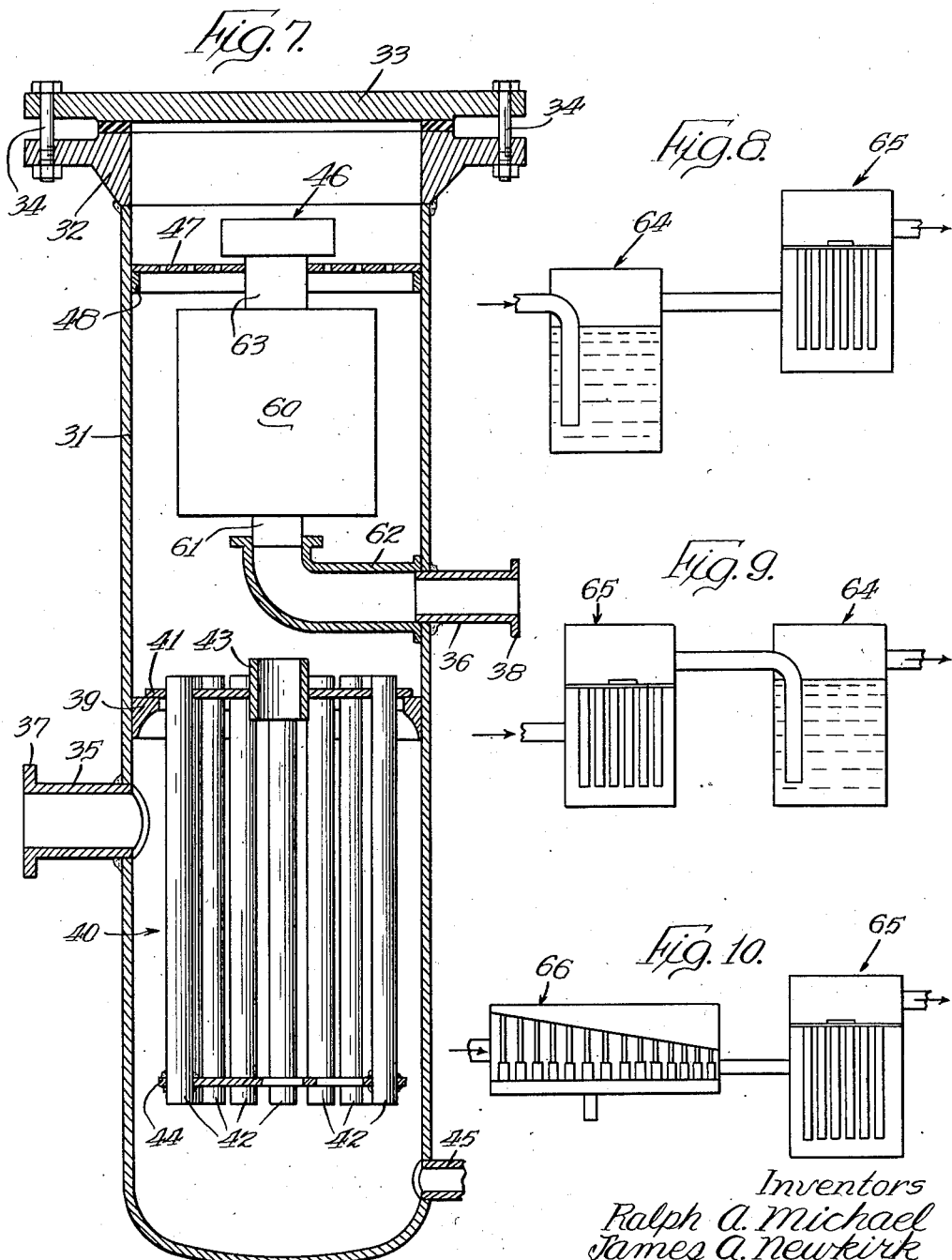

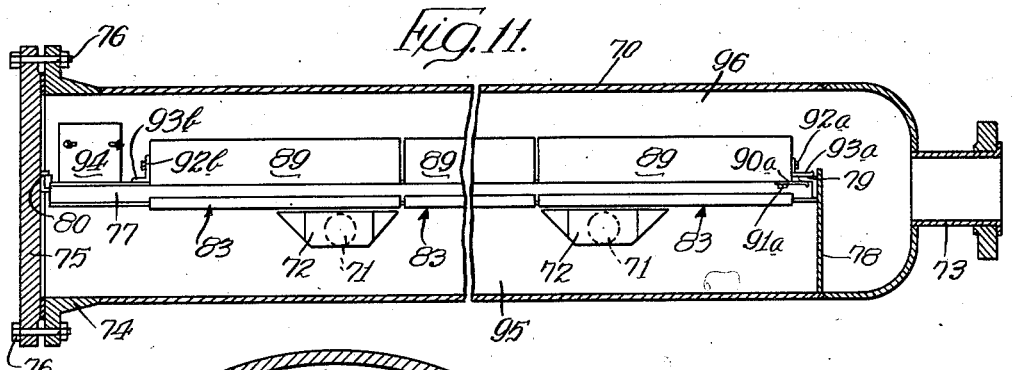
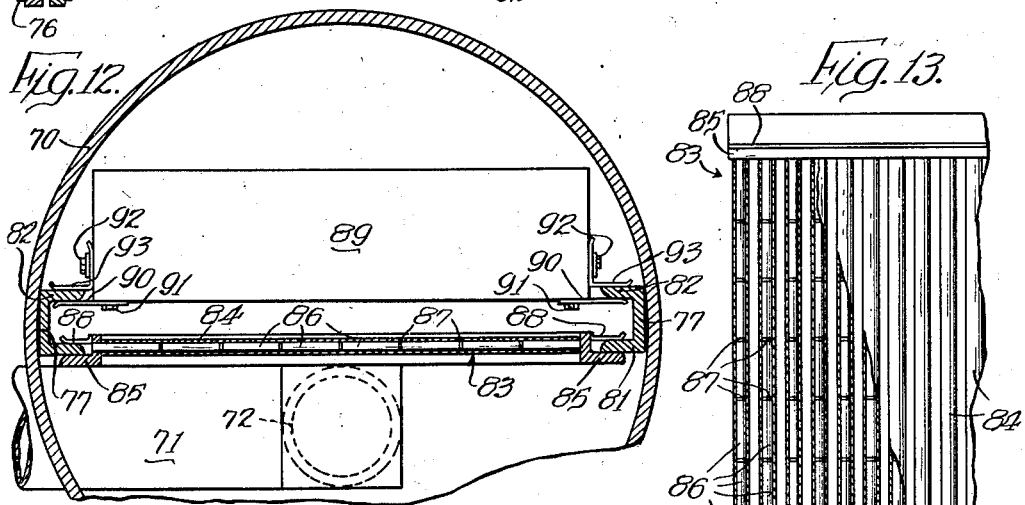
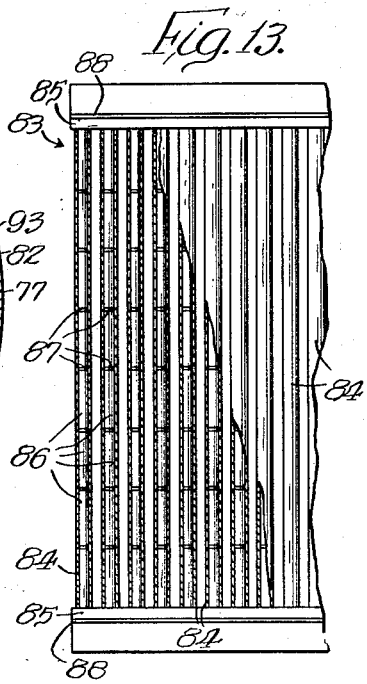
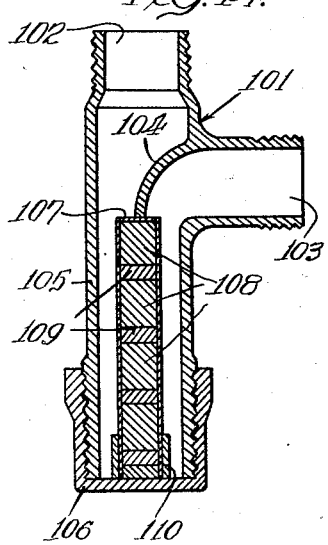
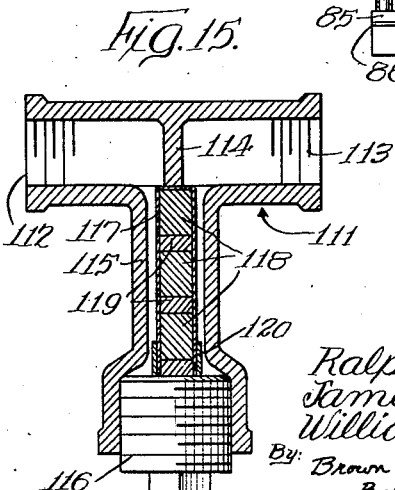
Inventors:
Ralph A. Michael
James A. Newkirk
William E. Preston
By: Brown, Jackson, Boettcher & Dienner
Attys.

2,789,655
MAGNETIC DUST TRAPS OR FILTERS

Ralph A. Michael, Blue Island, James A. Newkirk, Aurora, and William E. Preston, Homewood, Ill.

Application August 3, 1953, Serial No. 372,121

6 Claims. (Cl. 183—7)

The present invention relates to filters for fluids and, particularly, to improved magnetic filters.

It is an object of the present invention to provide an improved filter for fluids that exhibits a very low pressure drop, and that is economical in manufacture, extremely reliable and efficient in use, readily cleaned, not subject to clogging or stoppage of flow, effective in elimination of contaminants regardless of the rate of flow, effective to eliminate substantially all types and sizes of contaminants, not limited as to capacity, not subject to being destroyed by abrasion, and readily, easily and economically maintained.

It is also an object of the present invention to provide an improved filter as above noted and to employ said filter in troublesome installations in series with conventional filters, which are of the dry, wet and cyclone types, whereby the advantages of the latter may be obtained and whereby the filter of the invention eliminates the occurrence in the installation of the known and substanial disadvantages of the conventional filters.

Many fluids that are passed through pipes and conduit will contain a large percentage of ferrous contaminants. For example, commercial combustible gas in passage to service locations will contain a large quantity of fine particles of dust, of which 90 to 100% is ferrous, usually in the form of iron oxide. The iron oxide particles are highly abrasive and in passage of the gas through valves, meters and the like, abrade and rapidly wear down the valve seats, orifices, fittings, etc. Also, the dust frequently clogs the lines and orifices creating a very hazardous nuisance.

In view of the ferrous nature of the major portion of dust and dirt particles in the flowing fluid, we have conceived the invention of employing magnetic filter means, wherein magnetized members are employed in the line of flow to attract and hold from further travel a very great percentage of the total dust or contaminants. We are aware of certain prior proposals in magnetic filters, but none of these have achieved commercial practicality for several reasons. The most prominent reason for the failure of prior proposals is that the magnetic or other precipitation means was electrically energized. This is very disadvantageous, first, because of the difficulty, and substantial impossibility, of providing direct current electrical power at the filter, second, since a power interruption would result in all of the accumulated particles being released into the fluid stream and, third, because of the possibility of explosion should an electrical arc occur in the presence of a combustible gas-air mixture.

An object of the present invention is to provide improved magnetic filter means for fluids including permanent magnets as the filter medium.

Another object of the invention is to provide improved magnetic filters including at least one rod-like assembly of permanent magnets comprising a plurality of short permanent magnets preferably separated from one another, each end of each magnet serving as a collecting point whereby substantially the entire surface of the rod-like assembly is adapted for the attraction and holding of particles.

A further object of the invention is the provision of improved magnetic filters of the character defined including a housing and one or more of said rod-like magnet assemblies, the housing and assembly or assemblies being so constructed and arranged that magnetic particles collected by said assembly or assemblies establish a filter through which the fluid passes and by means of which non-magnetic particles in the fluid are filtered out.

A still further object of the invention is the provision of different types of magnetic filters formed in accordance with the above objects and adapted for special uses. In particular, it is an object, first, to provide large size filters adapted to be employed in the lines and/or mains of a system to eliminate large quantities of contaminants and, second, to provide small size units adapted to be disposed in individual service conduits to filter out such contaminants as may have been picked up by the fluid between the line or main filter and the appliance or appliances to be operated by the fluid.

In addition to the foregoing, it is an object of the invention to provide improved magnetic filters of the character described including non-magnetic containers within which the rod-like magnet assemblies are mounted, whereby the dust particles do not collect directly on the magnets and whereby the magnet assemblies may be removed from their containers to effect deenergization of the filter, thereby providing means accommodating gravitation of the dust from the magnet containers to a location from which the same may readily be removed.

It is also an object of the present invention to provide improved magnetic filters of the character above defined wherein the containers are tubes disposed directly in the path of fluid flow, to be vibrated to some extent by the flow so that the particles accumulated thereon will gravitate to a suitable collecting point for cleaning out of the filter.

Other objects and advantages of the invention will become apparent in the following detailed description of preferred embodiments of the invention.

Now, in order to acquaint those skilled in the art with the manner of making and using the improved magnetic filter means of the present invention, we shall describe, in connection with the accompanying drawings, several preferred embodiments of our invention and preferred manners of making and using the same.

In the drawings:

Figure 1 is a schematic representation of a fluid system showing a fluid supply line, a line filter, a plurality of mains leading from the line, a plurality of services leading from each main, and a service filter;

Figure 2 is a vertical section of a line or main filter formed according to the present invention;

Figure 3 is a cross sectional view of one of the rod-like magnet assemblies employed in the filter, the view being taken on line 3—3 of Figure 2;

Figures 4, 5 and 6 are vertical sectional views of the rod-like magnet assembly showing various manners in which the same may be formed;

Figure 7 is a vertical section similar to Figure 2 of a filter unit formed according to the invention including the magnetic filter of the invention and a conventional dry type filter disposed in series with the magnetic filter;

Figure 8 is a schematic representation of a series filter arrangement including a wet filter as the first stage and the magnetic filter of the present invention as the second stage;

Figure 9 is a schematic representation of a series filter arrangement including the magnetic filter of the present invention as the first stage and a conventional wet filter as the second stage;

Figure 10 is a schematic representation of a series filter arrangement including a conventional scrubber or cyclone filter as the first stage and the magnetic filter of the invention as the second stage;

Figure 11 is a vertical section of a horizontal filter formed according to the invention and including magnetic filter means and cloth filter means formed according to the invention;

Figure 12 is a cross sectional view of the filter shown in Figure 11;

Figure 13 is a top view, partly in section and partly in plan, of the magnetic filter means employed in the filter shown in Figures 11 and 12;

Figure 14 is a vertical section of one embodiment of the service filter means of the invention; and Figure 15 is a view similar to Figure 14 of a second embodiment of the service filter means of the invention, which embodiment is also particularly adapted for installation immediately in advance of appliances to be operated by the fluid in the system.

Hereinbefore, reference has been made broadly to the invention as comprising filter means for fluids. This is the true scope of the invention. However, the invention is particularly adapted for use in gas systems and installations, wherein the filter means is conventionally referred to as a dust trap. In view of these facts, the invention will be described in detail hereinafter as comprising dust trap means adapted for use in gas distribution systems. It is to be understood, nevertheless, that the invention has broad application as filter means for a wide variety of fluids.

Referring now to the drawings, and particularly to Figure 1, we have schematically shown a conventional gas distribution system as comprising a large supply line 20 from which the gas for a particular community is to be drawn. As the gas passes through the line 20, the same accumulates a considerable quantity of dust and dirt particles. To remove such dust and dirt particles, it is preferable to provide a line filter 21 having an inlet 22 connected to the line 20 and an outlet 23 for conducting the filtered gas to the inlet of a header or feeder main 24 or the like. The header 24 is provided with a plurality of outlets 25 each of which is adapted to be connected to a gas main 26. The gas mains 26 are of intermediate size and are adapted to distribute the gas throughout the community. Each main 26 is adapted to supply a plurality of services 27, which each comprise a conduit leading to a place of use, such as a place of business, a residence, or the like. In its passage from the line filter 21 through the service 27, the gas usually will pick up some dust from the mains and service. To clean the gas prior to use thereof, a service filter 28 is provided, preferably within the building to which the service leads, in the service in advance of any valves, appliances, meters, or the like. To the outlet side of the service filter 28, a pressure reducing or regulating valve 29 is normally provided and the gas is then conducted through a meter 30 for measurement of the gas consumption at the particular place of use. As will be obvious to those acquainted in the art, one or more conduits lead from the meter 30 to conventional appliances, such as a furnace, a stove, a refrigerator and the like. From the foregoing, it will be appreciated that the line 20 and the mains 26 comprise supply conduits for conducting gas to the services 27, and that large type filters, such as 21, may be employed where desired or necessary in the supply conduits.

The filter 21 as formed according to the present invention is shown in detail in Figure 2. The filter includes a conventional dust-trap or filter tank or housing 31 comprising a cylinder closed at one end, preferably the lower end, and open at the other end. An attaching collar or flange 32 is suitably secured, as by welding, to the open end of the cylinder and the same is adapted for the reception of a closure flange 33 for closing the upper end of the tank 31, the flange 33 being adapted to be detachably secured to the attaching collar 32 by means of suitable bolts 34 or the like extending through the flanges 32 and 33 adjacent the periphery thereof. Preferably, a seal is provided between the collar 32 and the closure flange 33, as is conventional. The cylinder 31 is provided in the side wall thereof with an inlet 35 and an outlet 36, each of which terminate in a mounting flange 37 and 38, respectively, by means of which the filter tank 31 is adapted to be connected in a supply conduit. The inlet 35 and the outlet 36 are preferably spaced from one another vertically, with the outlet being located above the inlet. Between the inlet and outlet, a circular flange 39 is welded or otherwise suitably secured to the interior wall of the cylinder 31. The flange 39 is adapted to support a magnetic filter unit indicated generally at 40. The magnetic filter unit 40 comprises a disc-like mounting plate or supporting member having a plurality of holes therein disposed in a circular path about the axis of the plate, each of which is adapted for the reception and passage of the upper end of a tube 42. The plate 41 is also provided with an enlarged central aperture within which an outlet pipe 43 is fitted. The tubes 42 and the outlet pipe 43 may be welded or otherwise secured to the plate 41. Adjacent the bottom of the tubes 42, the magnetic filter unit 40 includes a supporting plate 44 which is preferably in the form of a spider for supporting and retaining the tubes 42 in properly spaced and parallel relation. The tubes 42 may be formed in various manners, but the same are preferably open at the top and closed at the bottom, while the outlet pipe 43 is open ended. In the construction of the magnetic filter unit, the top plate 41, the tubes 42, the outlet pipe 43 and the supporting plate 44 are preferably formed of non-magnetic material, such as copper or brass. As will be appreciated, other non-magnetic materials will be suitable.

In the assembly of the filter, the disc-like top plate 41 of the magnetic filter unit 40 rests upon the circular flange 39 provided between the inlet and outlet, and the plate 41 seals against the flange so as to cut off direct communication between the inlet 35 and the outlet 36. In use then, gases entering the tank 31 through the inlet 35 must pass over and between the tubes 42 to the lower side of the outlet pipe 43, and then through the pipe 43 to the outlet 36. The tubes 42 each comprise containers adapted for the reception of a plurality of permanent magnets, which magnets create a magnetic flux path extending through the tubes 42 to establish magnetic lines of force extending between the various tubes 42. Thus, in effect, a cylindrical magnetic obstruction is presented in the path of flow of the gas so that any particles entrained in the gas capable of being magnetized will be attracted to and held against the tubes 42 by the permanent magnets disposed within the tubes. Since 90 to 100% of the contaminants in flowing gases comprise iron oxide, it will be appreciated that the filter unit of the invention is effective to filter out all or substantially all of the dust in commercial gas by magnetic attraction. Also, as the dust builds up on and between the tubes or containers 42, the magnetic dust will establish a porous but substantially continuous cylindrical pattern of dust particles so that gases passing therethrough will be filtered by the collected dust itself. Thus, non-magnetic particles entrained in the gas will also be filtered out.

The filter of the present invention is not subject to clogging for the reason that if the dust collected on the tubes 42 becomes too dense, the same will gravitate to the bottom of the tank. With respect to the substantially cylindrical filter network, as will be set up by collected magnetic particles, it will be apparent that the particles may shift and move apart when necessary to accommodate the flow of gas, so that the same will in no way clog the filter or obstruct the substantially free flow of gas from the inlet 35 to the outlet 36. Also, there will be a continuous gradual downward migration of the dust particles due to the force of gravity. As will be obvious, dust gravitating to the bottom of the tank or housing 31 will be located outside of the path of gas flow so that the same will not again be picked up and entrained in the flowing gas.

Dust collected in the bottom of the tank may be removed from the tank in any one of a number of manners. For example, a clean-out pipe 45 may be provided in the side wall of the tank 31 adjacent the bottom thereof. Also, a vertical lift conveyor means of the character shown in the copending application of William E. Preston and Ralph A. Michael, Serial No. 306,688, filed August 27, 1952, now abandoned, may be employed. As a further alternative, the filter may be shut down by closing off suitable valves provided adjacent the inlet and the outlet. Thereafter, the closure flange 33 may be removed from the top of the tank so as to accommodate removal of the permanent magnets from the tubes 42. As the magnets are slid out of the tubes 42, it will be appreciated that the dust collected on the tubes will immediately fall from the same since the tubes 42 are formed of non-magnetic material. In effect then, removal of the permanent magnets from the tubes 42 effects a deenergizing of the magnetic filter unit so that the collected dust will fall to the bottom of the tank 31, after which the dust may be scooped out or otherwise removed from the tank. After cleaning of the tank or housing, the magnets may be reinserted in the containers 42, the closure plate reapplied to the top of the tank, and the inlet and outlet valves opened, whereby the filter again will be ready for use.

The assembly of the permanent magnets in the tubes 42 is shown generally in Figure 3, and several different embodiments of such assembly are shown in Figures 4, 5 and 6. As shown in Figure 3, a cylindrical permanent magnet, indicated at 52, may be inserted in each tube 42. As has been pointed out hereinbefore, we prefer to employ a plurality of relatively short permanent magnets in each tube 42 so that a plurality of magnetic poles are provided to effect dust collection. As shown in Figure 4, a plurality of the short cylindrical magnets 52 may be disposed directly in the tube 42 in aligned relation, with short cylindrical plugs or spacers 54 of non-magnetic material disposed between adjacent magnets 52 whereby the strength of the magnetic field at each pole is not impaired. A modification of this simplified arrangement is shown in Figure 5, wherein the magnets 52 and spacers 54 are fitted within a secondary tube 56 of non-magnetic material, whereby the tube 56, spacers 54 and magnets 52 may be inserted in and withdrawn from the tube or container 42 as a unit. The tube 56 may be formed of any suitable non-magnetic material, such as a plastic tube or the like so that the magnets 52 and the spacers 54 may be readily inserted and automatically retained therein. A further modification of the magnet assembly to provide a connected string of magnets to accommodate insertion and withdrawal of the same as a unit is shown in Figure 6, wherein the magnets 52 are joined together and spaced apart by means of studs 58 formed of a suitable non-magnetic material. The connecting studs may suitably comprise members threaded at both ends and adapted to be threaded into tapped axial bores provided in the magnets 52, or the same may be plain studs press-fitted into bores provided in the magnets. To facilitate insertion and removal of the string of permanent magnets 52 as joined by the studs 58, a stud having an eye or bail 59 may be suitably secured to the upper surface of the top one of the magnets 59 to facilitate manipulation of the string. As will be apparent, other arrangements similar to those shown and described may be employed if desired to provide the rod-like assembly of permanent magnet.

Hereinbefore, reference has been made to the containers 42 for the permanent magnets as being tubes and the permanent magnets have been described as being cylindrical. While the containers for the magnets and the magnets themselves may be formed of various cross sectional configurations, we prefer to employ the tubular or cylindrical members defined so as to achieve the distinct advantage that the tubes are vibrated by the gases passing thereover whereby the tubes tend to be automatically self-cleaning, the vibration thereof effecting a gravitation of the particles collected on the tubes 42 to the bottom of the housing 31. By employing cylindrical bodies, the same are subjected to a vibration of relatively high frequency, but small amplitude, so that the tubes are not subjected to a severe vibration, but nevertheless are vibrated sufficiently to cause gravitation of the collected particles toward the bottom of the tank. This vibration is described in "Mechanical Vibration" by Den Hartog, second edition, at page 350.

In most installations, the magnetic filter unit of the invention will be effective to provide a complete cleaning of the fluid flowing therethrough. However, many service conditions may exist wherein a conventional filter unit can serve an advantageous purpose when used in series with our magnetic filter. For example, assume the existence of a gas having dust therein of which 60% is magnetic and 40% consists of non-magnetic fine particles would not be highly abrasive and therefore could optimumly be filtered out of the fluid by the employment of a conventional dry type filter as a second stage filter in series with a primary stage magnetic filter formed according to the invention. A practical embodiment of such a two-stage filter is shown in Figure 7. As shown, the structure is very similar to that shown in Figure 2, with the exception that a dry filter is incorporated in the dust trap or filter housing. The housing and magnetic filter unit are preferably of the same character as described hereinbefore with respect to Figure 2 and, accordingly, corresponding parts in the two figures have been indicated by the same reference numerals, reference being made to the description of Figure 2. In accommodating the tank or housing 31 to the combination magnetic and dry filter, it may be necessary to employ a slightly longer tank, otherwise the basic assembly of Figure 2 does not vary. The dry filter unit employed, as is indicated generally at 60, is a conventional cloth type unit having a peripheral inlet, over which filter cloth is stretched, and an axial outlet 61. The filter 60 is disposed above the magnetic filter 40 and above the outlet 36, and the outlet 61 thereof is connected by an elbow 62 to the outlet 36 of the tank 31. The outlet 36 thus communicates solely with the outlet of the dry filter and the outlet of the magnetic filter 40 communicates solely with the inlet of the dry filter 60. When employing a dry filter, it is preferable to employ a safety valve unit, indicated at 46, therewith should the dry filter become clogged or otherwise rendered inoperative. As shown, a conduit 63 preferably is provided to establish communication between the dry filter 60 and the valve unit 46. The dry filter may be mounted in the housing as desired, such for example as being suspended from a mounting plate 47 for the valve unit 46, which plate is adapted to be rested upon a supporting ring 48 secured to the wall of the tank 31, the plate being perforated to accommodate free flow of gas between the magnetic filter outlet 43 and the valve 46.

In use, the magnetic filter unit 40 operates in the same manner as described hereinbefore, whereby at least 60% of the dust existent in the fluid of the specific example referred to is removed. After the unit has been in operation for a time, the magnetic filter unit will be operative to remove more than just the magnetic particles from the fluid stream due to the fact that the collected magnetic particles themselves set up a filter screen through which the fluid must pass. Obviously, the filter screen of magnetic particles will filter out some of the non-magnetic fines in the gas stream. Any non-magnetic fines that succeed in penetrating the filter screen of magnetic dust particles will pass through the outlet pipe 43 of the magnetic filter unit to the area of the tank 31 within which the dry filter unit 60 is located. The gas will continue its flow and will pass through the filter cloth to the interior of the dry filter 60, during which passage all of the fines remaining in the gas stream will be filtered out so that the gas passing through the outlet 61 of the dry filter 60 and the outlet 36 of the dust trap will be clean gas. Thus, in the particular installation assumed, a conventional dry filter unit is used to great advantage, and the disadvantages of the conventional unit are eliminated by the employment of the magnetic filter unit of the present invention as a primary stage to filter out the majority of the contaminants in the fluid, including all of the magnetic particles, and large particles whether magnetic or non-magnetic, and a certain percentage of the non-magnetic fines.

In view of the foregoing, it will be apparent that other conventional filter means may be employed advantageously in series with the magnetic filter of the present invention. For example, as is shown schematically in Figure 8, a conventional wet type filter 64 may be used as a primary stage filter in series with a magnetic filter 65 formed according to present invention as the second stage. Alternately, as is schematically shown in Figure 9, the magnetic unit 65 of the present invention may be utilized as the primary stage in series with a second stage wet filter 64. In arrangements such as those shown and described, certain advantages of a conventional wet type filter may be enjoyed, while the magnetic filter unit of the present invention obviates the disadvantages of the conventional filter.

As has been pointed out hereinbefore, the conventional scrubber or cyclone type filter is particularly effective in the removal of large size particles and liquid contaminants from various flowing fluids. However, this type of apparatus suffers several disadvantages as have been mentioned. Thus, it will be apparent that the conventional cyclone type filter would have particular advantage as a primary filter stage, so as to reduce the work load upon a magnetic filter formed according to the present invention, which latter filter would eliminate the disadvantages of the former. Such an arrangement is shown schematically in Figure 10, wherein a conventional scrubber or cyclone type filter unit, indicated at 66, is employed as a primary stage filter in series with the magnetic filter 65 of the present invention as a secondary filter stage.

A second embodiment of the combined magnetic and dry filter provided according to the present invention, particularly adapted for horizontal installation, is shown in Figures 11 to 13 as comprising a housing 70 in the form of a generally cylindrical tank having a plurality of substantially radially disposed inlets 71, each equipped with a baffle 72, and an axially disposed outlet 73 in one end thereof. The opposite end of the tank or housing is provided with an attaching collar or flange 74 to which a closure flange 75 is adapted to be detachably secured by means of bolts 76 or the like. A seal is preferably provided between the collar 74 and the flange 75. As shown in Figure 11, the present embodiment of the invention is particularly adapted for horizontal mounting either above or below the ground. If the housing is mounted below the ground, it is preferable to utilize a vertical access hole adjacent the end of the tank to which the closure flange 75 is secured, so as to accommodate access to and cleaning of the tank.

Within the tank, a pair of supporting members 77 in the form of channels are suitably secured to the wall of the tank, as by welding, in sealed relation thereto, with the base or bight portion of the channels disposed vertically. The channels are preferably disposed diametrically opposite one another so that the mounting of the same with the bight portion thereof disposed vertically is readily accomplished. When the supporting channels are mounted in the manner defined, the inlet conduits 71 are disposed horizontally below the channels, as is shown in Figure 12. The supporting members or channels 77 terminate short of the outlet end of the tank or housing 70, and at this point a closure plate 78 extends between the channels. The plate 78 is in the form of a segment of the circle defined by the inner diameter of the tank and is secured to the wall of the tank, suitably by welding, in sealed relation thereto with the base or straight edge thereof disposed in alignment with the upper surfaces of the channels 77 so as to seal off the space beneath the channels 77 at one end thereof. An angle iron 79 is suitably secured to and extends along the base or straight edge of the segment 78 so that the same joins the ends of the channels 77.

At the opposite end of the tank, the closure 75 carries a channel 80 adapted to extend between the side channels 77 to seal off the space beneath the same at that end of the housing. The legs of each of the channels define a pair of vertically spaced horizontal bars 81 and 82 in the housing, with corresponding bars or legs comprising a mounting for a plurality of filter units. As shown, the lower bars or legs 81 are adapted to support a plurality of magnetic filter units, indicated generally at 83. Each magnetic filter unit 83 comprises a plurality of non-magnetic tubes 84 disposed in spaced parallel relation and extending between and secured at their opposite ends in or to suitable supporting members in the form of angle irons 85. Each tube 84, at at least one end thereof, extends through the supporting member so as to present an open end adapted for the reception of a plurality of permanent magnets 86 and a plurality of non-magnetic spacers 87 adapted to be arranged in alternate relation within the tubes in substantially the same manner as described hereinbefore with reference to Figures 2 and 6. The tubes 84 are adapted to extend transversely of the housing 70 and are secured to or mounted in the vertical legs of the angle irons 85. The horizontal legs of the angle irons are each adapted to abut against the lower surface of the lower bar 81 with which associated. To attach the magnetic filter units to the bars 81, spring metal seals 88 are secured to the vertical legs of the angle irons 85 adjacent the upper edge thereof so as to abut against the upper surface of the bars 81, whereby the members 88 support the filter units 83 and seal off the space beneath the filter units except to the passage of gas through the units 83. Preferably, we provide a plurality of relatively short magnetic filter units 83, as is shown in Figure 11, to accommodate ready assembly, repair, servicing and cleaning of the dust tray.

The upper legs or bars 82 of the channels 77 are adapted for the reception and support of a plurality of relatively short dry filter units 89, each of which includes a container having an inlet facing the magnetic units 83, an outlet opening upwardly and a filter cloth or other suitable filter medium (not shown) between the said inlet and outlet so that gas flowing through the magnetic filter units 83 must pass through the dry filters prior to passage of the gas to the outlet 73. Each dry filter unit 89 includes a guide seal adapted to be associated with the bars 82. The guide and seal referred to preferably comprise a guide rail 90 detachably secured to the lower surface of each unit 89 by means of bolts 91 and adapted to engage the lower surface of each of the bars 82. Adjustably secured to each side of each filter unit 89, suitably by means of bolts 92, is a side seal 93 adapted to engage the upper surface of the associated bar 82 so as to support the filter unit 89 and to seal the space beneath the filter unit against flow of gas except through the filter unit. A similar seal is provided at the outlet end of the assembly, adjacent the closure plate 78, to seal against the angle iron 79, as is indicated at 90a, 91a, 92a, 93a. A further seal of a similar nature is provided at the opposite end of the filter units 89, as is indicated at 92b and 93b.

As is shown in Figure 11, the magnetic and dry filter units 83 and 89, respectively, terminate in spaced relation to the closure flange 75, whereby an area is provided on the supporting channels 77 for the reception of a relief valve unit 94. Generally, the relief valve 94 is of the same character as described hereinbefore with reference to Figure 7, the same being provided with an inlet opening into the space below the channels 77 and an outlet opening into the space above the channels 77, the valve body being sealed with respect to the channels 77 so as normally to close off communication between opposite sides of the supporting channels. As will be appreciated then, the housing 70 is divided by the filter units into an inlet chamber 95 and an outlet chamber 96, communication between the two chambers being established solely through the magnetic filter units 83 and the dry filter units 89. Gases or fluids entering the inlet chamber 95 through the inlets 71 are directed by the baffles 72 upwardly against the filters, so that the gases will be filtered, first, by the magnetic units 83 and, then, by the dry filter units 89, prior to passage of the gas or fluid to the outlet 73 of the dust trap.

In use and operation of the embodiment of the invention shown in Figures 11 to 13, substantially the same operational characteristics will be exhibited as described hereinbefore with respect to the embodiment of the invention shown in Figure 7. In particular, the magnetic filter, as the primary stage filter, will perform the greater bulk of the work to be accomplished by the dust trap, so that the dry filter units need serve only the specialized service for which they are best suited. The gases flowing over the cylindrical rod-like permanent magnet assemblies, will subject those assemblies to vibration in much the same manner as described hereinbefore so that dust collected by the magnetic filter means will constantly be shaken so as to gravitate to the bottom of the tank, where the same will be located outside of the path of flow of the fluid to be filtered and where the same may readily be cleaned out of the housing 70.

In view of the foregoing, it will be appreciated that the present invention provides highly improved filter or dust trap means for flowing fluids. In particular, the present invention provides improved magnetic filter means for flowing fluids, particularly commercial gases, that is economical of construction, highly efficient in use, and readily maintained and serviced. Also, the invention provides improved combination filter means comprising the magnetic filter means of the invention as employed in series with filters of conventional types.

In the foregoing, particular attention has been given the large size filter units adapted for installation in a supply line or main where the rate of flow of fluid is relatively high. Two embodiments of the small filter units provided by the present invention for installation in service lines, as is indicated at 28 in Figure 1, are shown in Figures 14 and 15. In the embodiment of the invention shown in Figure 14, a body or housing 101, preferably formed of non-magnetic material, includes a first port 102, a second port 103, a wall 104 extending between the two ports, and an extension portion 105 extending downwardly from the free edge of the wall 104 in general alignment therewith. Either of the ports 102 or 103 is adapted to be used as the inlet, as desired, and the housing is preferably provided with an external pipe thread at each port for the reception of suitable service conduits. The extension 105 is provided with an external screw thread whereby a closure cap 106, preferably formed of non-magnetic material, may be secured thereto. The space between the cap 106 and the free edge of the wall 104 is adapted for the reception of a rod-like permanent magnet assembly comprising a non-magnetic container or tube 107 within which a plurality of permanent magnets 108 and a plurality of non-magnetic spacers 109 are adapted to be mounted in alternate relation. The top of the magnet assembly is preferably closed off by the non-magnetic tubing 107 and abuts against the free edge of the wall 104 to seal against the wall so that fluid entering one port in the housing must flow around the magnet assembly before flowing through the outlet port. Thus, the magnet assembly is effective to filter out contaminants in the same manner as the embodiments of the invention described hereinbefore. As will be appreciated, the amount of contamination in a service conduit, where the system is provided with a large type filter of the character described hereinbefore, will be quite small so that the service filter unit need not have a large contaminant collection capacity. To center the magnet assembly within the housing 101, the closure cap 106 preferably includes a tubular guide 110 in which the lower end of the magnet assembly may be positioned.

As will be apparent, the service filter unit shown in Figure 14 is extremely economical of manufacture and assembly. The device is highly efficient in use and is readily maintained. For example, to clean the filter, it is merely necessary to remove the cap 106, pull out the magnet assembly, wipe the same off, and then reassemble the magnets and the cap 106 with respect to the housing. Dust collected in the bottom of the extension 105 will automatically gravitate from the housing upon removal of the cap 106. As will be appreciated from the foregoing and a consideration of Figure 14, the present embodiment of the invention comprises a three-legged structure, a first port being provided in one leg, a second port being provided in a second leg, and a magnet assembly being provided in the third leg, with means being provided in the housing to insure disposition of the magnet assembly between the two ports with respect to the path of fluid flow. In the particular embodiment, we have provided an axial port 102 and a radially disposed port 103, whereby the unit is particularly adapted for association with the type of valve indicated at 29 in Figure 1.

A second embodiment of the service filter unit of the present invention is disclosed in Figure 15, which embodiment of the invention is particularly adapted for installation in a straight length of service conduit. Due to such adaptation, the unit is particularly useful to filter the fluid flowing to a particular appliance. As shown in Figure 15, the service filter unit comprises a T-shaped body 111, wherein the horizontal portion of the T comprises an axial passageway presenting ports 112 and 113 at opposite ends thereof. In the center of the passageway, a transverse wall 114 is provided so as to direct fluids flowing through the passageway into the stem or extension 115 of the T. Internal threads are preferably provided at each end of the passageway formed in the horizontal portion of the T so that the ports 112 and 113 are adapted for the association therewith of suitable service conduits. The stem portion of the T is enlarged at the lower end thereof and the said enlargement is provided with an internal thread whereby the same is adapted for the reception of a closure plug 116. A rod-like magnet assembly, comprising a non-magnetic container or tube 117 within which a plurality of permanent magnets 118 and a plurality of non-magnetic spacers 119 are arranged in alternate relation, is adapted to be disposed within the stem portion of the T-shaped housing between the free edge of the wall 114 and the top of the plug 116. Thus, the magnet assembly is disposed directly in the path of fluid flow for the attainment of the purposes and advantages described with respect to the embodiment of the invention shown in Figure 14. Preferably, a tubular guide 120 is provided on the top of the plug 116 within which the magnet assembly may be disposed to center the magnet assembly in the housing. As will be apparent, the embodiment of the invention shown in Figure 15 is adapted for the accomplishment of the same filtering functions as the embodiments of the invention described hereinbefore.

While we have described what we regard to be preferred embodiments of our invention, it will be appreciated that various changes, rearrangements and modifications may be made therein without departing from the scope of the invention as defined by the appended claims.

We claim:

1. For a filter for flowing fluids including a housing having a fluid inlet and a fluid outlet, a magnetic filter unit to be disposed in the housing between the inlet and the outlet, said unit comprising a pair of spaced non-magnetic supporting members, a plurality of non-magnetic containers extending between and supported by said members, and magnetic means comprising a plurality of relatively short permanent magnets disposed within each of said containers, said magnetic means being disposed entirely within said containers.

2. In a filter for flowing fluids including a housing having a fluid inlet and a fluid outlet, a magnetic filter unit to be disposed in the housing between the inlet and the outlet, said unit comprising a pair of spaced parallel supporting members, a plurality of non-magnetic containers extending between and supported by said members in spaced parallel relation, and magnetic means mounted entirely within said containers, said magnetic means comprising a plurality of short permanent magnets and a plurality of non-magnetic spacers disposed in alternate relation in each of said containers.

3. In a filter for flowing fluids including a housing having a fluid inlet and a fluid outlet, a magnetic filter unit to be disposed in a housing between the inlet and the outlet, said unit comprising a pair of spaced parallel supporting members, a plurality of non-magnetic tubes extending between and supported by said members in spaced parallel relation, said tubes extending through at least one of said members and being open at that end thereof, said one member shielding the open ends of said tubes from fluid flow, and magnetic means mounted entirely within said tubes, said magnetic means comprising a plurality of relatively short permanent magnets and a plurality of non-magnetic spacers disposed in alternate relation within each of said tubes, said magnets and said spacers being movable into and out of said tubes through the open end thereof.

4. A dust trap for gas distribution systems comprising a housing having an inlet and an outlet, spaced supporting means in said housing between said inlet and said outlet, a plurality of non-magnetic containers supported on and extending between said means adjacent said inlet, magnetic means mounted entirely within said containers and comprising a plurality of relatively short permanent magnets disposed in spaced relation in each of said containers, a filter unit of the dry type supported in said housing between said containers and said outlet, and baffle means disposed in said housing between said inlet, said dry filter unit and said containers to prevent fluid flow directly from said inlet to said dry filter unit and to direct fluid flow from said inlet first past said containers and then through said dry filter unit.

5. A dust trap for gas distribution systems comprising a housing adapted to be disposed horizontally and having an inlet and outlet, horizontally aligned spaced supporting means in said housing extending longitudinally thereof between said inlet and said outlet, a plurality of non-magnetic tubes supported on and extending horizontally in spaced parallel relation between said means, a plurality of relatively short permanent magnets disposed in spaced relation in each of said tubes, a filter unit of the dry type supported by and extending between said tubes and said outlet in spaced parallel relation to said tubes, sealing means disposed between said dry filter unit and said supporting means whereby said housing is divided between said inlet and said outlet into an inlet chamber and an outlet chamber by said tubes and said dry filter unit, and safety valve means supported by said supporting means and adapted to establish communication between said inlet chamber and said outlet chamber.

6. For a filter for flowing fluids including a housing having a fluid inlet and a fluid outlet, a magnetic filter unit to be disposed in the housing between the inlet and the outlet, said unit comprising a plurality of non-magnetic containers supported in spaced parallel relation, and magnetic means mounted entirely within said containers, said magnetic means comprising a plurality of relatively short permanent magnets mounted in spaced relation within each of said containers, said containers being disposed closely adjacent each other so that magnetic particles in the fluid collected on the surfaces of said containers establish a filter screen through which the fluid passes and by means of which non-magnetic particles in the fluid are filtered out.

References Cited in the file of this patent

UNITED STATES PATENTS

| | | |
|---|---|---|
| 914,696 | Briney | Mar. 9, 1909 |
| 2,317,774 | Kiek et al. | Apr. 27, 1943 |
| 2,583,522 | Winslow et al. | Jan. 22, 1952 |

FOREIGN PATENTS

| | | |
|---|---|---|
| 58,797 | Germany | Oct. 10, 1891 |
| 194,107 | Great Britain | Mar. 8, 1923 |